US008441482B2

(12) United States Patent
Özdaç et al.

(10) Patent No.: US 8,441,482 B2
(45) Date of Patent: May 14, 2013

(54) SYSTEMS AND METHODS FOR SELF-INTERSECTION AVOIDANCE IN RAY TRACING

(75) Inventors: Cüneyt Özdaç, Berkeley, CA (US); Jason Rupert Redgrave, Mountain View, CA (US)

(73) Assignee: Caustic Graphics, Inc., San Francisco, CA (US)

( * ) Notice: Subject to any disclaimer, the term of this patent is extended or adjusted under 35 U.S.C. 154(b) by 888 days.

(21) Appl. No.: 12/563,436

(22) Filed: Sep. 21, 2009

(65) Prior Publication Data

US 2011/0069067 A1    Mar. 24, 2011

(51) Int. Cl.
*G06T 15/50* (2011.01)
(52) U.S. Cl.
USPC ........... 345/426; 345/419; 345/420; 345/421; 345/422; 345/423; 345/427; 345/581; 345/582; 345/587
(58) Field of Classification Search .................. 345/581, 345/582, 589, 419–427, 587
See application file for complete search history.

(56) References Cited

U.S. PATENT DOCUMENTS

| 7,098,907 | B2 | 8/2006 | Houston et al. | |
|---|---|---|---|---|
| 7,495,664 | B2 * | 2/2009 | Keller et al. | 345/426 |
| 7,952,583 | B2 * | 5/2011 | Waechter et al. | 345/426 |
| 8,115,763 | B2 * | 2/2012 | Woop et al. | 345/420 |
| 2008/0150944 | A1 | 6/2008 | Reshetov et al. | |

FOREIGN PATENT DOCUMENTS

WO    WO 2008/037599 A1    4/2008

OTHER PUBLICATIONS

Galligo et al. "A Sampling algorithm computing self-intersections of parametric surfaces".Published 2006.*
Dammertz et al. "Improving Ray Tracing Precision by Object Space Intersection Computation". IEEE 2006.*
Amanatides et al. "Some Regularization Problems in Ray Tracing". AT&T Bell Laboratories, 1990.*
J. Hanika and A. Keller, "Towards Hardware Ray Tracing using Fixed Point Arithmetic," IEEE/EG Symposium on Interactive Ray Tracing, 2007, Sep. 10-12, 2007, Ulm, Germany, pp. 119-128.
P. H. Christensen, J. Fong, D. M. Laur and Dana Batali, "Ray Tracing for the Movie 'Cars'," IEEE Symposium on Interactive Ray Tracing, 2006, pp. 1-6.

(Continued)

*Primary Examiner* — Kimbinh T Nguyen
(74) *Attorney, Agent, or Firm* — Michael S. Garrabrants; ArtesynIP, Inc.

(57) ABSTRACT

Aspects include systems, methods, and media for implementing methods relating to detection of invalid intersections during ray tracing. Invalid intersections can arise from imprecision in computer-based number representation, causing ray origins to be located inappropriately. In some aspects, a ray can be associated with information relating to an expected angle between the ray's direction and a normal for a to-be-identified primitive intersected by that ray. If the angle between the ray's direction and the normal of an intersected primitive is within expectations, then that information can be used in predicting whether the intersection is valid. Such expectation information can be presented as a single bit determined by a shader performing a dot product of the ray and a normal of a primitive intersected by a parent ray, or can be obtained as a by-product of ray/primitive intersection testing. Such information also can be based on whether the shader is emitting to have reflection or refraction type ray behavior.

31 Claims, 7 Drawing Sheets

OTHER PUBLICATIONS

Eric Haines, "Ray Tracing News: Light Makes Right" [Online], vol. 2, No. 8, Oct. 27, 1989. Retrieved from the Internet: URL:http://tog.acm.org/resources/RTNews/html/rtnews9a.html> [retrieved on Oct. 26, 2009].

James T. Klosowski, Martin Held, Joseph S.B. Mitchell, Henry Sowizral and Karel Zikan, "Efficient Collision Detection Using Bounding Volume Hierarchies of k-DOPs," IEEE Transactions on Visualization and Computer Graphics, Jan. 1998, vol. 4, issue 1, pp. 21-36.

Roni Yagel and John Meeker, "Priority-driven Ray Tracing," The Journal of Visualization and Computer Animation, vol. 8, No. 1, pp. 17-32, Jan. 1, 1997.

Martin Christen, "Ray Tracing on GPU," Master's thesis, Univ. of Applied Sciences Basel (FHBB), Jan. 19, 2005 (Available online at http://gpurt.sourceforge.net/DA07_0405_Ray_Tracing_on_GPU-1.0.5.pdf, last visited Dec. 10, 2009).

Andrew Kensler and Peter Shirley, "Optimizing Ray-Triangle Intersection via Automated Search," IEEE Symposium on Interactive Ray Tracing 2006, Sep. 18-20, 2006, pp. 33-38.

Carsten Alexander Wachter, "Quasi-Monte Carlo Light Transport Simulation by Efficient Ray Tracing," Ph.D. thesis, Universität Ulm, 2008.

* cited by examiner

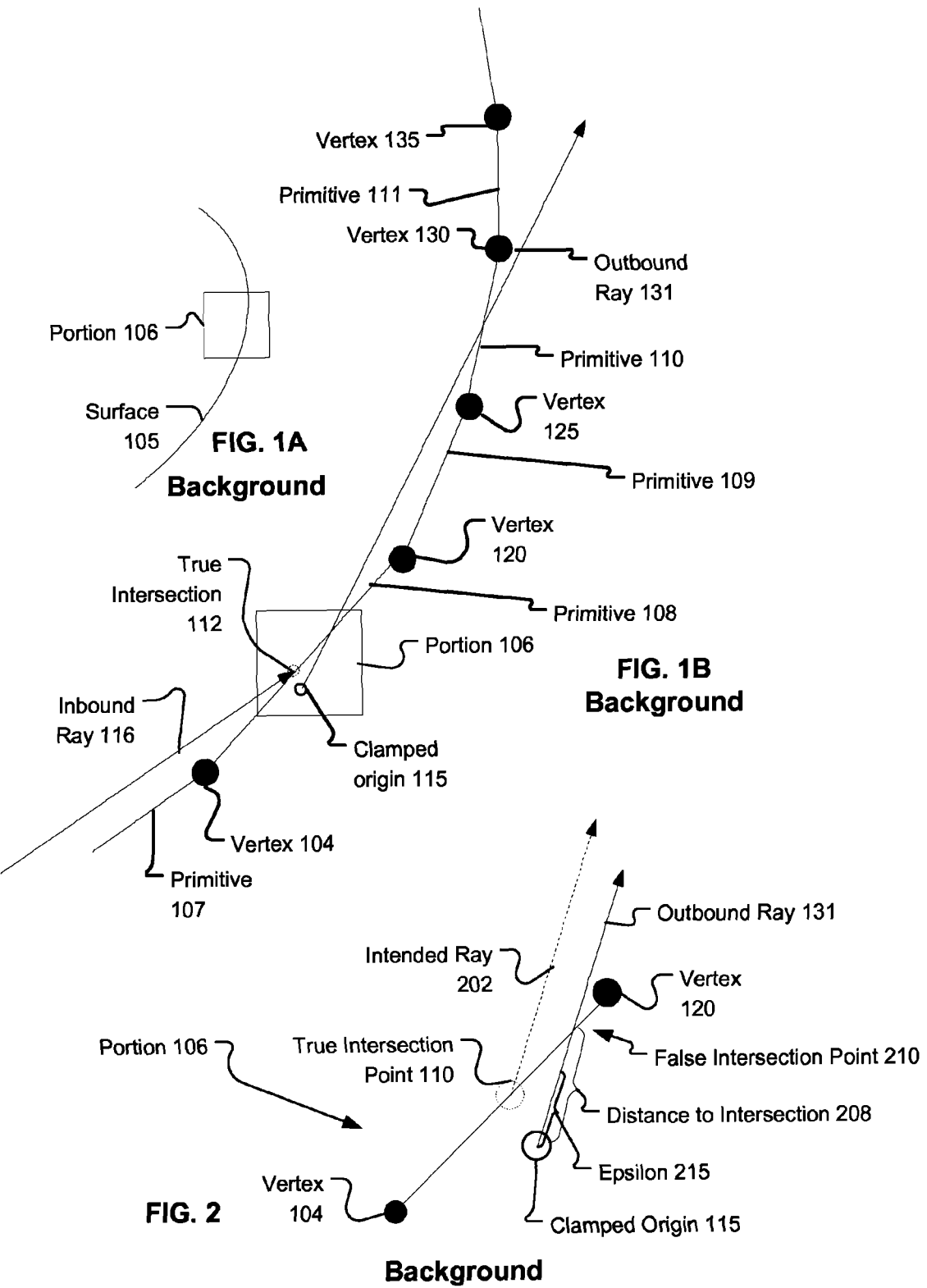

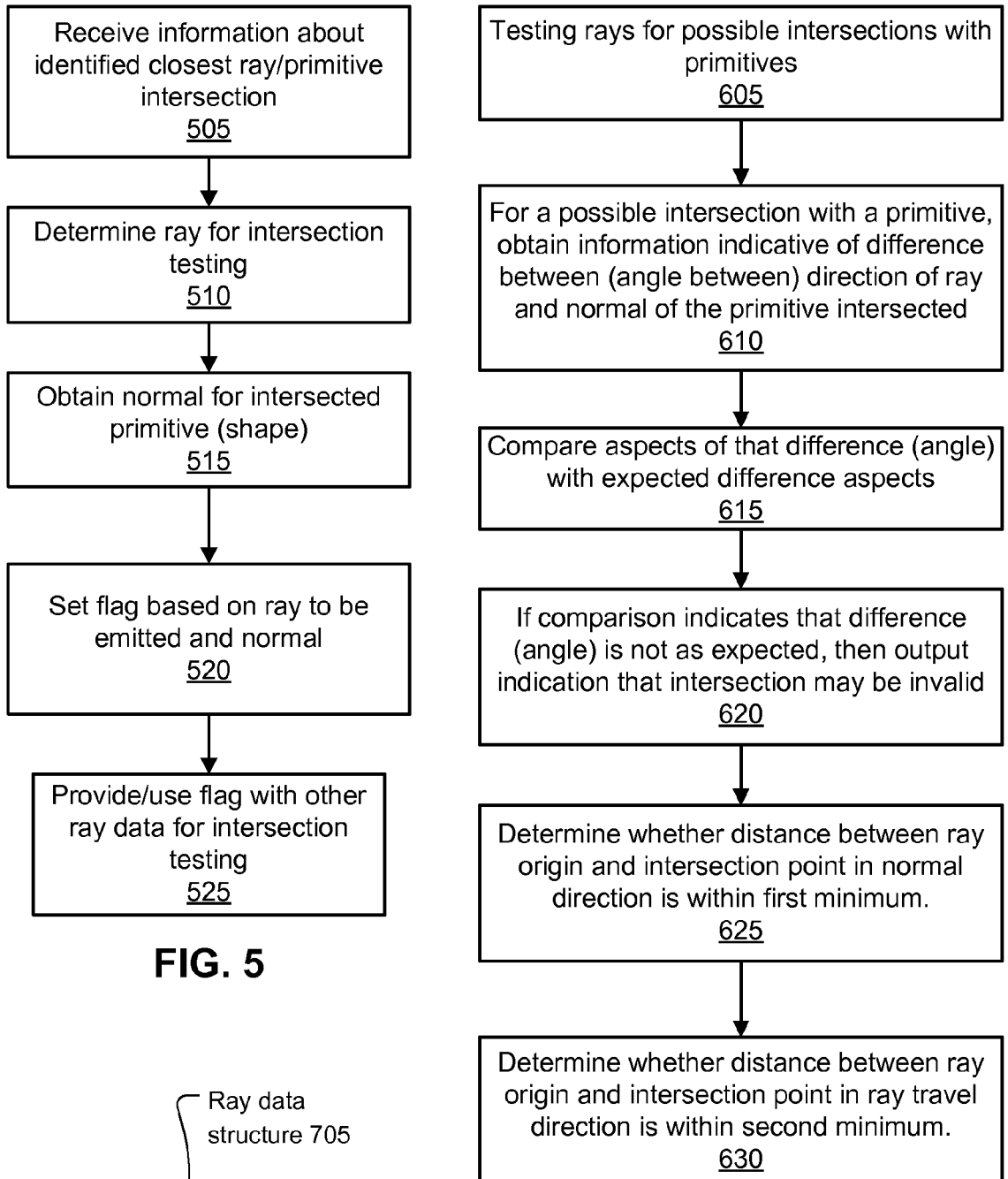

SYSTEMS AND METHODS FOR SELF-INTERSECTION AVOIDANCE IN RAY TRACING

BACKGROUND

1. Field

The following relates generally to ray tracing systems that can be used, for example, in rendering 2-D representations of 3-D scenes, and more specifically to handling self-intersection effects due to limited precision calculations.

2. Related Art

Rendering photo-realistic 2-D images from 3-D scene descriptions with ray tracing is well-known in the computer graphics arts. Ray tracing usually involves obtaining a scene description composed of geometric shapes, which describe surfaces of structures in the scene, and can be called primitives. A common primitive shape is a triangle.

Virtual rays of light are traced into the scene from a view point ("a camera"); each ray is issued to travel through a respective pixel of the 2-D representation, on which that ray can have an effect. The rays are tested for intersection with scene primitives to identify a closest intersected primitive for each ray, if any.

After identifying an intersection for a given ray, a shader associated with that primitive determines what happens next. For example, if the primitive is part of a mirror, then a reflection ray is issued to determine whether light is hitting the intersected point from a luminaire, or in more complicated situations, subsurface reflection, and scattering can be modeled, which may cause issuance of different rays to be intersection tested. By further example, if a surface of an object were rough, not smooth, then a shader for that object may issue rays to model a diffuse reflection on that surface. As such, finding an intersection between a ray and a primitive is a step in determining whether and what kind of light energy may reach a pixel by virtue of a given ray, since what light is hitting that primitive still needs to be determined.

When a primitive has been found to be intersected by a ray, and the shader for that intersection is to be executed, an intersection point of the ray is defined based on where the intersection on the primitive was found. This intersection point is to serve as the origin for child rays that a shader may cast when shading this intersection.

This origin is usually implemented as a floating point tuplet of a certain precision, such as single precision or double precision. Primitives and other objects that generally can be intersected in a scene are smooth surfaces, which also "exist" at points in 3-space. Therefore, these scene surfaces exist at points in the scene that cannot be precisely represented by a number of a given precision. This is true whether single or double precision floating point is used (or even some more precise number interpretation), as computers are expected to have a capability to represent numbers only to a finite precision. This is true also for at least the practical reason that the more precise a number representation is to be, the more data is required to represent that number.

Therefore, the intersection point (origin for child rays) in the abstract represents a point on a surface determined to have been intersected by a ray, and ideally would serve as the exact origin for new rays resulting from shading. However, that point can only be expressed to a finite precision, and thus, the data describing the point, as it is stored, can have, and quite often does have, errors that place the intersection point off the surface of the scene that was intersected.

One problem that results is that child rays can have false intersections with the same primitive that their parent ray intersected. Another problem is that rays can fail to intersect a primitive that they were supposed to intersect. These intersection errors can result in rendering errors, such as gaps between portions of an object.

Currently, there are two known approaches to this problem, which is often called the "self-intersection" problem. One approach is to define a sphere of small radius around the intersection point (origin for child rays), and when a potential intersection is identified, a determination is made whether that intersection is outside of that sphere. This approach thus is directed to the situation where a child ray hits the same primitive as its parent.

Another approach to this problem has been to tag each child ray with information that identifies the origin primitive of that ray (i.e., the primitive whose shader spawned the child ray). Then, when a potential intersection for that child ray is identified, the potentially intersected primitive is compared with the origin primitive, and if they match, the intersection is rejected. A practical solution that uses this approach often can require further processing, such as an adjacent face rejection decision in which all vertices of a hit primitive are checked to see whether any of those vertices are in common with those of the origin primitive, and then the angle of incidence for the child ray is compared with that of the parent ray. Given that billions of intersection tests need to be performed in high quality ray tracing-based rendering, it is desirable to avoid these tests, which are relatively expensive to implement. These tests also do not necessarily give perfect results, as they are heuristic in nature.

SUMMARY

As introduced above, some aspects of the present disclosure are for ray tracing a 3-D scene while handling inaccuracies caused by imprecision of number representation in computers. The following summary describes example aspects within the scope of the claims and disclosure.

A ray can be described with a direction vector and an origin. At the point of intersection between a ray and the surface, there is a normal direction. Where the surface is composed of primitives, such as triangles, the normal direction can be included with the definition for the primitive intersected.

One example aspect includes a method which comprises identifying an intersection between a child ray and a surface in the 3-D scene. The child ray can be emitted during shading of an intersection involving a parent ray.

The method comprises characterizing an angle between the child ray and the normal of the surface at the child ray intersection. The method also comprises categorizing the child ray intersection as a potentially valid or as a potentially invalid intersection based on the characterization of the angle and on information characterizing the direction of the child ray compared with a normal of the surface at the intersection involving the parent ray.

Thus, the child ray direction is compared both with the normal of a surface intersected by a ray, for which shading of an intersection resulted in the child ray, and with the normal of a surface intersected by the child ray itself. In some cases, an invalid intersection can be where the child ray was found to intersect the same surface as the parent ray. Typically, such an invalid circumstance can result where due to numerical imprecision, an origin of the child ray is placed on one side of the surface intersected by the parent ray or the other.

In one aspect, a dot product between the child ray direction and each of the surface normals is taken, and the sign resulting from each dot product is compared with the other. In some aspects, the sign of the dot product between the child ray direction and the normal for the surface intersected by the parent ray can be stored as a bit in a data structure representative of the child ray. Other ways to obtain information equivalent to the described dot product sign can be provided, including using a information resulting from performing a three half-plane intersection test algorithm to implement the intersection testing, for example.

Further tests for intersection validity can include checking how far from an origin of the child ray, in the normal direction, the surface intersected by the child ray is. A further check, or a substitute check along the direction of ray travel also can be made.

Such methods can be implemented by systems. Such systems can be implemented with computer executable code used to configure processing resources; functional modules of code, custom logic, and the like can be used to implement such systems.

Further aspects include provision of an application programming interface that can be used by shaders (code executing responsive to identified intersections) to emit child rays for intersection testing. The application programming interface can include run time code for calculating a sign of the dot product between the child ray and the surface normal for the parent ray intersection. Data, such as the vector for that surface normal can be stored in data structures in a memory accessible to the shader run time code.

Still further aspects can include systems and computer executable code for implementing a scene processor that assigns normals or otherwise modify a scene description to make better usage of the described methods and systems.

BRIEF DESCRIPTION OF THE DRAWINGS

FIG. 1A depicts a curved surface that can be intersected during ray tracing of a scene containing the surface;

FIG. 1B depicts tessellation into primitives of a portion of the surface of FIG. 1A, depicting how representation of rays hitting a given primitive may be affected by machine number precision limitations;

FIG. 2 depicts further aspects of how ray tracing can be affected by computer-based number precision limitations;

FIG. 5 depicts an example method for establishing data that can be used in detecting primitive self-intersection during ray intersection;

FIG. 6 depicts steps of a method that can be implemented responsive to a detected intersection, for analyzing whether the detected intersection is invalid;

FIG. 7 depicts aspects of an example datastructure that can store information representative of a ray and information that can be used during intersection analysis;

DETAILED DESCRIPTION

Figure 3A:
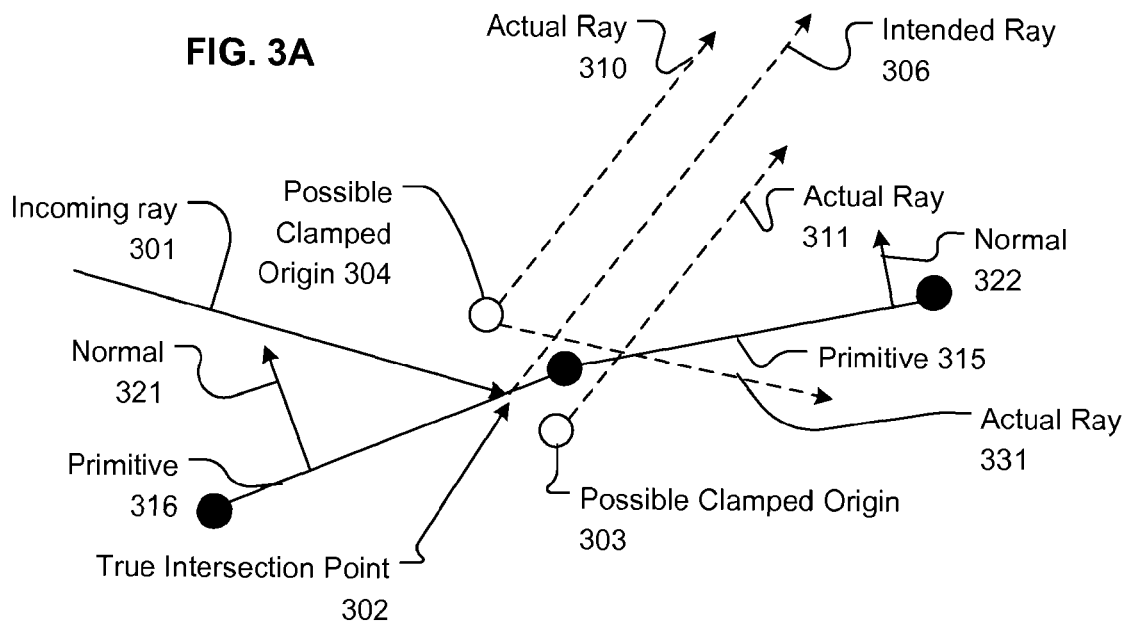
FIGS. 3A-3C depict aspects of how reflection and refraction rays can be considered with respect to normals of intersected primitives, to develop an approach for detecting self-intersection problems.

The following primarily relates to using ray tracing as a mechanism to render 2-D representations of 3-D scenes. The 3-D scenes to be rendered often are created (specified) by artists who are designing content, such as a video game, a motion picture, an animated advertisement, industrial models, architectural features, such as buildings, and so on. An artist can be a person, or a person using authoring tools, or even can itself be primarily driven by software. To produce content descriptive of a 3-D scene, an artist contends with a number of challenges. For one thing, an artist describes the physical boundaries (surfaces) of the scene and the objects in it. The description of such physical boundaries can be detailed. For example, a useful model of a car being designed using Computer Aided Design (CAD) requires precise specification of the components of the car as well as their spatial relation to each other.

The artist also describes how the surfaces of the scene objects should look and behave. For example, an accurate model of the car would represent window glass differently from a headlight glass, differently from a painted surface. For example, in a video game, the artist would model a skin surface differently from a hair surface, and so on.

Thus, one construct employed in the field of rendering is to provide a physical scene model, and associate surface information with different parts of the scene model. For example, a scene model can contain objects including a person, an automobile, and a building. The physical model of the scene would describe the surfaces of these objects, for example, as a wire frame model, which can include a large number of primitive shapes interconnected with each other to describe boundaries of the surfaces. This physical model generally lacks information about the visual appearance of the objects' surfaces. Then, information and programming is associated with particular surfaces, and/or portions of particular surfaces that describe their appearance. Such information can include textures for the surfaces, while programming associated with the surfaces often is intended to model what effect the surface has on light hitting the surface. For example, programming allows modeling of glass, a shiny surface, a bumpy surface and so on. Such programming and information thus is bound or otherwise associated with portions of the physical model descriptive of those surfaces. For example, programming can be associated with or bound to a particular primitive. Such programming and other description, or portions thereof, for a particular primitive or scene object can be referred to generally as a "shader" for that primitive or object.

The following description, for clarity, primarily uses examples where scene objects being rendered are represented by meshes of simple planar shapes, such as triangles. In the context of such planar primitives, a normal direction to the planar surface can generally be predetermined and assigned. However, objects for which intersection testing can be performed can be described with other methodologies, such as parametric methodologies, such as Bézier patches. In these contexts, a surface does not necessarily have a single normal direction. Rather, upon identifying an intersection point between the surface and a given ray, a normal of the surface at that intersection point can be identified. Thus, a normal vector in the following description encompasses both a normal for an entirety of a planar surface and a normal vector identified for a particular intersection point on a planar or non-planar surface.

Computers represent real numbers with finite precision, and when implementing these models, inaccuracies and visual artifacts can be caused by imprecision.

FIG. 1A depicts a cross section of a curved surface 105, of which a portion 106 is identified. Such a surface 105 typically would be modeled by using a large number of small polygons that share vertices, making a mesh that approximates a smooth surface. For example, FIG. 1B depicts an excerpt of portion 106 of surface 105. FIG. 1B depicts vertexes 104, 120, 125, 130 and 135, respectively forming primitives 107, 108, 109, 110, and 111. A ray 116 is depicted heading toward ("inbound") to portion 106, and is determined to intersect surface 105 at primitive 108.

Such an intersection can be determined by using any of a variety of intersection tests, such as the barycentric coordinate test, or the Moller-Trombore algorithm. In addition to determining whether there was an intersection between ray 116 and primitive 108, such testing also usually determines the intersection point on primitive 108. Such tests usually are conducted in floating point. All floating point calculations have a finite precision, and can only represent certain numbers. Thus, regardless of the precision used in the floating point tests, inaccuracies in representing results are inevitable. In the case of ray intersection testing, one inaccuracy that results is that the hit point between a ray and a primitive can be slightly inaccurate.

With reference to FIG. 1B, true intersection point 110 represents where on primitive 108 the ray should be represented to have hit. However, that number is not representable in the system as presenting constructed, causing the intersection point to be located at clamped origin 115. In this case, the representable hit point is called clamped origin 115, because it serves as an origin for a child ray to be emitted during shading. Such child rays can include rays that are for testing reflection or refraction behavior. FIG. 1B depicts a reflection ray, outbound ray 131. As can be discerned from FIG. 1B, clamped origin 115 is on the wrong side of surface 105, in that it should have been on the surface, such that ray 131 would start from the left surface of primitive 108 and travel in the scene in the direction depicted. However, due to the inaccuracy depicted, ray 131 will first intersect with primitive 108 again, before it ends up on the correct side of surface 105. To allow for a more intuitive understanding of the description, in some places, the terms "reflection" and "refraction" have been used to describe intended ray behaviors and are not intended to be limiting of types of rays that may exhibit such behaviors. For example, where an intended behavior of a ray is to have the ray "bounce" from an intersection point, that intended behavior can be called reflection behavior, while where intended ray behavior is to have a ray transmit through an intersected surface, that behavior can be called refraction behavior. The intended behavior of a given ray typically is determined by code that emits the ray, which is conveniently called a "shader" herein.

This intersection thus is an invalid self-intersection. One approach to detecting such intersections is depicted in FIG. 2, which depicts in greater detail a portion of FIG. 1B. In particular, FIG. 2 depicts that an epsilon 215 can be applied along the direction of travel of ray 131, and if a distance 208 to a detected intersection (false intersection 210) from origin 115 is within that epsilon, then it is considered an invalid intersection. Although this approach helps reject some false intersections, the selection of the epsilon 215 is a heuristic, and even when it is selected to be comparatively small, it still does not reject all false intersections, and further setting it too large also can cause rejections of valid intersections, even while still allowing invalid intersections. If more precision were used in number representation, the problem would continue to exist, with smaller numbers. As also discussed, an approach that separately tracks an identity for a primitive intersected by a parent ray (here, primitive 108) can be maintained with ray 131, but that approach would consume a lot of memory if many rays were in flight at the same time, and it also presents some difficulties with adaptive geometry approaches, where a given primitive may be adaptively tessellated into multiple primitives, such that the original primitive may not exist in the form that it was previously when child rays are tested.

FIG. 3A depicts a first example of an approach to detecting invalid ray intersections. FIG. 3A depicts primitives 315 and 316, where a ray 301 is incoming and hits primitive 316 at true intersection point 302 (here, true intersection point 302 represents a theoretically precise point that may not be realizable). Instead, given the floating point representation employed, the intersection point may be represented at a different location. It is not determinable where that intersection point is with respect to primitive 316, and thus possible clamped origin 304 and possible clamped origin 303 are depicted to represent that the actual hit point (and origin, in many cases, for child rays) can be clamped to any point within the unit of lowest precision of the vertices or other spatial points being used in defining locations in the scene being ray tracing.

If clamped origin 304 were the numerically represented origin, then a child ray with a given direction would be as depicted by actual ray 310, while if clamped origin 305 were the numerically represented origin, then a ray with that same direction would be as actual ray 311 in FIG. 3A, while the desired ray should have traveled as intended ray 306 depicts. For example, a ray of such direction could be emitted to test reflection on the intersection point. However, because the origin of that ray can vary, in some cases, the closest primitive intersected by such a ray may not be a valid intersection. In the particular situation depicted in FIG. 3A, primitive 315 will be intersected first if the origin was at 303, causing an invalid intersection.

In a first example, when the intended ray 306 is emitted (e.g., when the direction of the ray is defined, and it is to originate at the origin determined based on the hit point—as it can be numerically represented), information about an angle between the normal of primitive 316 (the primitive intersected by incoming ray 301) and the direction of ray 306 is determined. Such information can include calculating at least the sign of an inner product between normal vector 321 for primitive 316 and a direction vector for ray 306 (ray 306 is identified, although it would be understood that the direction is being discussed, while the exact path of travel also depends on the origin, which can vary). In these disclosures, numerical representation of a direction also suffers from imprecision of numerical representation, and these disclosures also can address such imprecision. In many figures, both an actual and an intended ray path are depicted. It would be understood that the actual path represents the ray as it would travel, while the intended ray path shows a hypothetical path under "ideal" conditions. However, for purposes of discussion, either ray can be identified as representing a direction of travel for the actual ray.

Figure 3B:
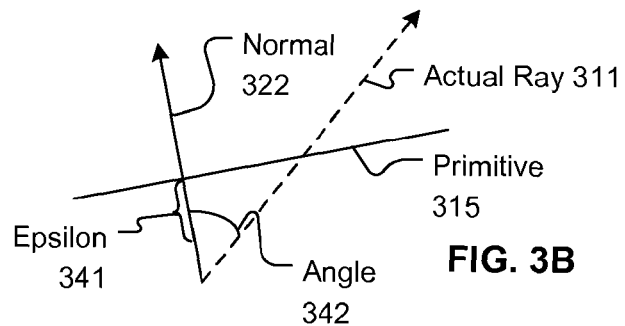

FIG. 3B depicts a closer view of an angle 342 between normal 322 and ray 311. As shown, and by comparison with FIG. 3A, ray 311 intersects primitive 315 from a side of primitive 315 opposite from a side that incoming ray 301 intersected primitive 316. Since the angle between normal 322 and ray 311 is acute, a dot product of vectors in those two directions (e.g., normal 322 and a normalized ray 311) would be positive (as described below). FIG. 3B also depicts an epsilon measured along normal 322, to be used as described below.

The assigned epsilons herein preferably are assigned based on an expected reasonable range of the scene. Such assignment is done based on the nature of floating point arithmetic, where larger numbers have lower precision, such that an epsilon that works well for "closer in" (to an origin) positions would not be expected to work well at "very far out" points. So, the epsilons are selected to balance the competing needs of precision, while handling variations in available precision for the useful portion of a scene being ray tracing.

In one approach, an epsilon to be used in analyzing a given intersection can be selected dynamically. In one example of a dynamically-selected epsilon, an intersection can be identified by a set of vertices, such as a set of vertices of a primitive intersected (e.g., 3 vertices). Each vertex can be specified by a tuple of floating point numbers, specifying a point in space. In one preferred example, an epsilon is selected based on a largest exponent of the set of vertices for a given identified ray/primitive intersection, or, stated more generally, a largest exponent of a set of floating point numbers specifying an intersection between a ray and a surface. The epsilon can be modified based on a bias or other allocation of available bits in the floating point system being used. The epsilon also can be set based on leaving some guardband for accumulated error.

The number obtained based on the largest exponent, however, is to be clamped to a minimum in situations where the obtained number is small compared with an exponent of the normal vector in the number system being used. Thus, the epsilon preferably is set to be no smaller than a number based on an exponent associated with a unit length vector in the number system used, and larger, as the intersection is farther away from the origin, using the largest exponent of those vertices defining the surface that was intersected. For a IEEE single precision floating point implementation, an error accumulation guardband of four or five bits is acceptable. For IEEE single precision, a minimum epsilon preferably is set to no less than about 108, such as 108, 109, 110, 111, and 112.

Figure 3C:
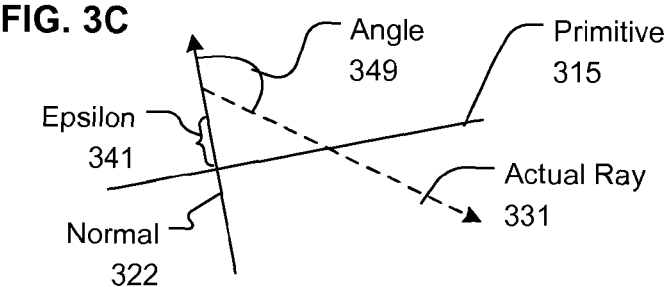

FIG. 3C depicts an example where primitive 315 and its normal 322 are depicted with ray 331 that forms an angle 349 with normal 322. Ray 331 intersects primitive 315. In FIG. 3C, a dot product between normal 322 and ray 331 (or vectors with respective directions derived therefrom) would be negative, because the angle between these vectors is obtuse (as described below, the description of using a dot product is for ease of explanation, rather than requiring any particular implementation to calculate a dot product or its sign, as other methodologies for obtaining the required information, such as the three half-plane intersection test for triangular primitives.

Where triangular primitives are used in composing screen objects, the triangles are typically represented by vertex data. Vertex data for triangles can be expressed as a triangle strip, a first triangle in a strip is defined by three vertexes, but then each additional triangle can be expressed by addition of another vertex to the strip, and using two other vertices already part of the strip. Typically, a winding order for the vertices is used to determine normals for the triangles of the strip. In such a case, alternating triangles would have alternating normals (if using the same winding order for all triangles); thus, it is expected that the normals of alternating triangles would be reversed. After such reversal, adjacent triangles generally would have normals pointing in the same direction. This issue of convention regarding normal direction can be handled at a variety of points, including at either scene setup or during a self-intersection detection/prevention process, for example.

Figure 4A:
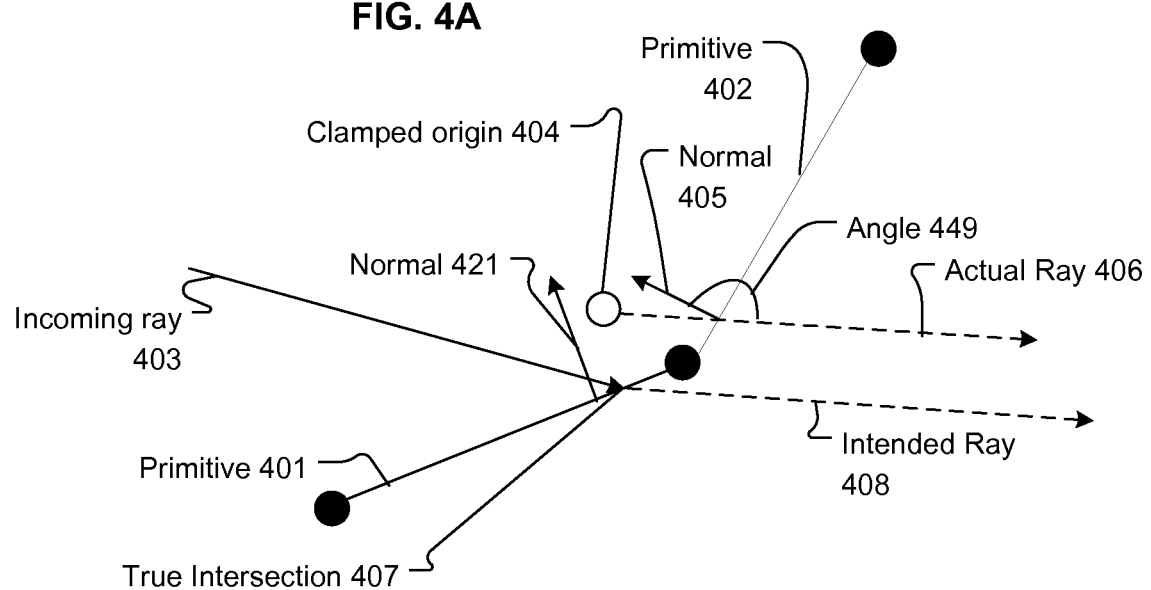
FIGS. 4A-B depict further aspects of using primitive normals in an approach to detection of invalid intersections, such as self-intersections.

FIG. 4A depicts further examples of situations addressable by implementations of these disclosures. An incoming ray 403 intersects a primitive 401 at true intersection point 407. Primitive 401 has a normal 421. Primitive 401 shares a vertex with primitive 402, which has a normal 405. A shader is run for shading the intersection of primitive 401 and ray 403. That shader emits a ray that is intended to have an origin and direction as depicted by the origin and direction of intended ray 408. However, the origin of the ray to be emitted during such shading is claimed to clamped origin 404. Then, based on the same direction (as numerically representable), an actual path of the ray to be emitted will be as depicted by actual ray 406. As such, FIG. 4A represents a situation where a shader is to emit a refraction ray, such as may be appropriate for a translucent material. It can be seen from FIG. 4A that the intended ray 408 would not intersect primitive 402; however, because origin 404 is moved, the first primitive actually intersected by the emitted ray is shown by actual ray 406 (i.e., primitive 402). Such an intersection, although correctly detected (there was an intersection, for the ray as actually emitted and tested), the intersection is nevertheless invalid, because it fails to represent the true intention of the shader. If such an intersection is considered valid for the ray, then the refraction characteristics intended for that ray will be improperly represented.

In a first approach to detecting these invalid intersections, a ray is emitted, such as from a shader for a detected intersection. That emitted ray has a direction, which is compared with a normal of the primitive from which the ray was supposed to originate (in FIG. 4A, for intended ray 408, the primitive is primitive 401, and thus the normal is normal 421). In one example, at least a sign of a dot product between normal 421 and a direction vector representative of the direction of ray 408 (equivalently ray 406) (for simplicity, direction of ray 406) is obtained. The sign bit thus represents whether the angle between the direction of ray 406 and normal 421 is greater or less than 90 degrees. As will be described below, this information can be used in a comparison with a dot product between the direction of ray 406 and a normal of a primitive intersected by the ray as actually emitted (in FIG. 4A, primitive 402). In the example of FIG. 4A, a sign of a dot product between direction of ray 406 and normal 405 is calculated (generally, the directions of the rays as actually emitted and as intended to be emitted—i.e., ray 406 versus ray 408, will be the same).

In the refraction ray example of FIG. 4A, a sign of a dot product between normal 421 and direction of ray 406 would be negative. Similarly, a sign of a dot product between normal 405 and that direction also would be negative, as both of these normals form obtuse angles with a vector of that direction. Since both of these signs are the same (i.e., both would be negative, absent further processing or other manipulation or sign convention), it can be concluded that the intersection with primitive 402 may be invalid.

Figure 4B:
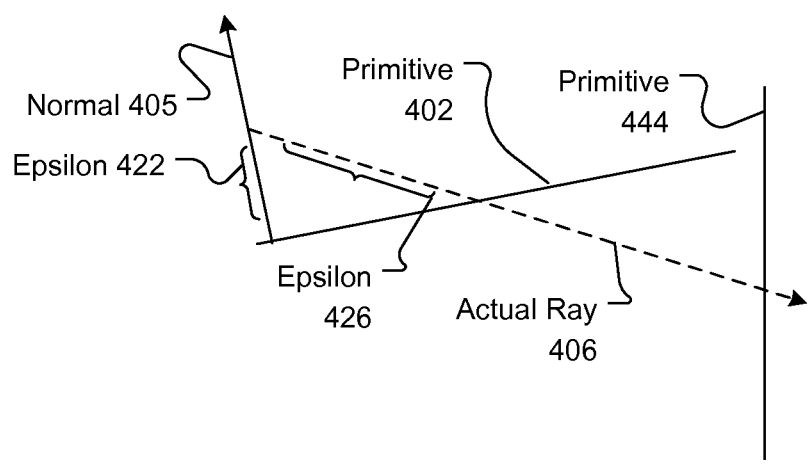

FIG. 4B depicts examples of further analysis that can be conducted to confirm or refute that the intersection is invalid. In a preferred implementation, an epsilon 422 is provided for use along normal 405, such that a distance in the direction of normal 405 between clamped origin 404 and the plane in which the surface of primitive 402 exists is compared with epsilon 422. If that distance is less than epsilon 422, then the intersection is considered more likely to be invalid.

FIG. 4B depicts that a further epsilon 426 can be provided that is used to test a distance between clamped origin 404 and the intersection point with primitive 402 (i.e., along the direction of travel of ray 406). If this distance is less than epsilon 426, then the intersection also is considered more likely to be invalid.

The epsilons depicted in the figures identify what distance quantity will be compared with the epsilon value (or components of a vector, with a multiplier (preferably less than 1) of the epsilon; therefore, the bracket for each epsilon does not imply a value for the epsilon, but rather the distance value to be compared against it.

FIG. 5 depicts method aspects that can be implemented by one or more of a shader and an Application Programming Interface (API) that is provided for use by shaders in interfacing with a ray tracing system. The method depicted in FIG. 5 includes receiving information about a closest intersection for a ray (for disambiguation, a "parent ray"), which would cause a shader to execute, which in this example causes determination (510) of a ray (a "child ray") to be emitted for intersection testing. The method also comprises obtaining a normal for the intersected primitive which caused the shader to run (in other words, a normal for the primitive intersected by the parent ray). A dot product (or, in some implementations, at least a sign thereof) between that normal and the direction of the child ray can be obtained. Thus, upon emission, the ray can be assigned a bit based on a sign of the dot product (also can be called a flag or other similar nomenclature, without loss of generality) of the primitive intersected by its parent ray and its direction (520).

More general than obtaining a dot product, or even explicitly calculating a sign bit of a dot product of the identified vectors, a bit that can be used in methods according to this disclosure can be produced as a result of intersecting testing, itself. For example, in a case where triangular primitives are used in defining scene objects, the three half plane ray/triangle intersection test produces a bit that can be used in these methods, in that information resulting from this test provides an indication whether the ray hit a front side or a back side of the tested primitive, where a normal direction convention determines which side is the front and which is the back.

That bit can then be provided (525) for use in verifying potential intersections involving the child ray, as explained below. FIG. 7 depicts that a data structure for the child ray may contain a field for storage of the bit, and fields for an origin and a direction.

FIG. 6 depicts aspects of a method that can be implemented during intersection testing. The depicted method includes testing rays for possible intersection (605). For an identification of a possible intersection with a primitive, information indicative of a difference between the ray direction and a normal of the primitive intersected can be obtained (accessed). This information can be obtained, for example, by calculating a dot product (or only a sign) of the ray direction and the normal for the intersected primitive, or as a by-product of intersection testing. That difference information is then compared with a bit provided with the ray, which in one example, can be calculated by the dot product of that same ray and a normal of the primitive intersected by the parent ray whose shading spawned the ray being tested.

If the sign bit calculated agrees (i.e., it is the same sign), then it is expected that the intersected is more likely to be invalid. If the sign bits disagree then the intersection is more likely to be valid. This analysis can be summarized as a comparison that indicates whether the difference between these sign bits is or is not within an expectation (620). Such a description comprehends situations where further bit changes can be made, resulting in a different sign convention.

The above description provides examples of methods and systems that can implement disclosed heuristics to identify potentially invalid intersections between rays and surfaces. Because the detection of self-intersections (or the lack thereof) is heuristic, further testing can be done (either before or after the usage of any of the disclosed heuristics) to further develop a final decision about whether to consider a particular intersection valid or invalid. Such further testing is exemplified by the remainder of the method of FIG. 6.

The method of FIG. 6 also may implement a distance determination first along a normal direction of the primitive intersected by the ray, and if the distance between the ray origin and the plane in which the intersected primitive exists along that normal direction (see e.g., FIG. 3B) is closer than a determined epsilon, then the intersection is determined more likely to be invalid (625). Implementations also can provide a distance check in the direction of the ray itself (630), as depicted, for example, in FIG. 4B, with epsilon 426.

Still further implementations can provide a distance check along one or more components of the vector describing the ray direction (likewise, in the normal direction, for that test). For example, an epsilon against which a distance is compared can be defined, and rather than performing a precise distance check, the distance check can be approximated by comparing each component vector with some fractional multiplier of the epsilon. In still further examples, an epsilon can be defined with components for each component of the space, and in such examples, the distance check can be done component-by-component.

The method of FIG. 6 depicts three tests that each can be used to develop information about whether a given intersection is more or less likely to be invalid or valid. The method of FIG. 6 depicts an example where a flow for a method presumes validity, and then testing can result in a finding of invalidity. Conversely, a method flow can begin from a presumption of invalidity, and testing can prove validity. The testing would be adjusted accordingly. Also, the depicted method showed a linear progression of tests. However, each of the tests can be conducted concurrently. Also, the examples were to a preferred approach where the normal test was conducted first, followed by one or more epsilon tests. However, the order of such testing can be different, or not all of the epsilon tests need be done. In a preferred approach, all tests need to result in a finding of potential invalidity to invalidate a given intersection. However, in other implementations, a vote among the tests can be conducted, with majority dictating the outcome; such voting can be weighted, preferably to favor the normal test. Other approaches, based on these examples, can be provided.

Figure 8:
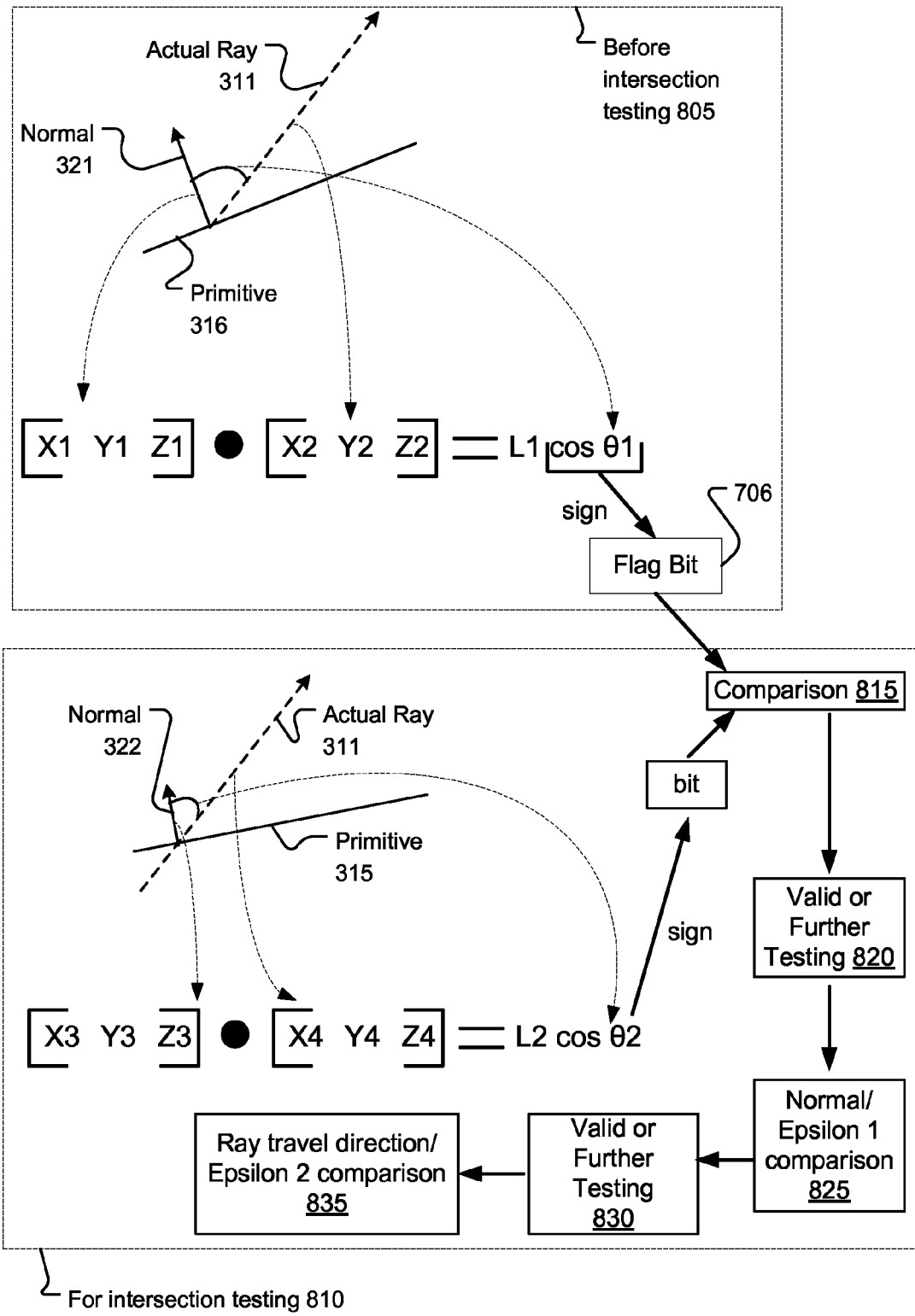
FIG. 8 depicts a particular implementation where dot products are used to generate the information used during analysis of intersections.

FIG. 8 diagrams dataflow and other aspects of how implementations of the described self-intersection avoidance aspects may be provided. FIG. 8 uses an example generally in accord with FIG. 3A, wherein a point on primitive 316 is supposed to be an origin for ray 311, and primitive 316 has normal 321. FIG. 8 depicts that, before intersection testing (805) of ray 311, the vectors representing normal 321 and ray 311 can be used in an inner product calculation to produce a magnitude and a cosine of an angle, which represents a sign. The cosine is negative for angles greater than 90 degrees, and FIG. 8 depicts that at least the sign is maintained as a flag bit 706 (represented in data structure 705).

Ray 311 can then be intersection tested (810), and is found to intersect with primitive 315, which has normal 322. Normal 322 and ray 311 can then be used in a dot product to produce a sign bit that is compared (815). Based on the comparison, a finding of validity can result (e.g., if the signs mismatch, as expected in an example sign convention); further testing also can be conducted (820), if the comparison indicates a possibility of invalid intersection. Further testing can be conducted in either case. One aspect of further testing is the epsilon in the primitive normal direction (825). Validity can be confirmed based on this additional testing, or more testing can be done (830), or even in both cases, if desired. Such further testing can include testing a distance epsilon in the direction of ray travel (835). In one implementation, if the signs match, and the distances are within their respective epsilons, then the intersection can be invalidated.

Figure 9:
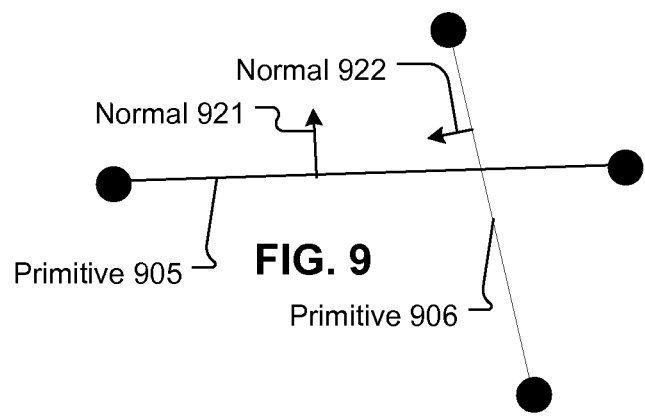
FIGS. 9 and 10 depict an approach to determining primitives for defining scene surfaces and assigning normals thereto, which can help increase the accuracy of the normal-based intersection analysis described.
Figure 10:
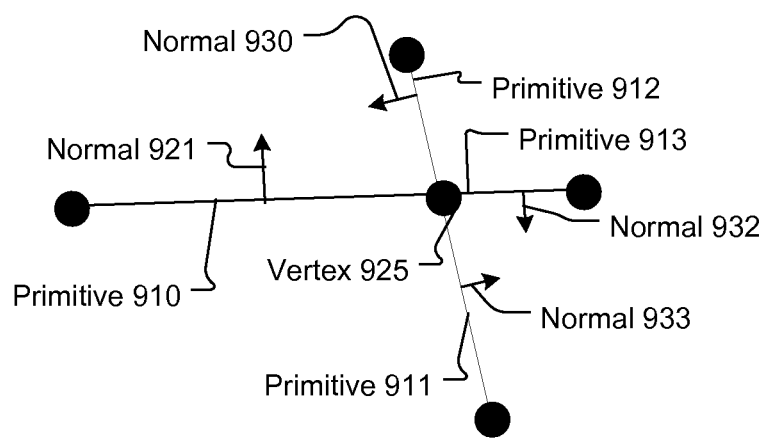

FIGS. 9 and 10 depict an example where primitives composing a given 3-D scene are provided and their normals selected to facilitate intersection avoidance implementations according to these examples. FIG. 9 depicts a situation where two primitives cross in scene space (looking at a cross-section, where the primitives extend perpendicular to the page). Primitive 905 has normal 921 and primitive 906 has normal 922. FIG. 10 depicts splitting up primitives 905 and 906 into a different primitive decomposition that allows assignment of normals as described. Now, primitive 910 is provided with normal 921, which terminates at a new vertex 925, where primitive 913 begins, which has normal 932 pointing opposite normal 921. Similarly, vertex 925 also divides primitives 912 and 911. Primitive 912 has normal 930 and primitive 911 has normal 933, each pointing in opposite directions.

Considering the refraction ray example of FIGS. 4A-4B, assigning the normals as described helps determine that ray 406 intersecting primitive 444 is a valid intersection, for a refraction ray coming through primitive 401. In particular, it was discussed that where sign bits for the dot products of the normal of the primitive intersected by the parent ray and that intersected by the child ray match, that tends towards rejecting that intersection for the child ray. In particular, referring to FIG. 4B, it can be understood that an angle between normal 405 and ray 406 is greater than 90 degrees, and hence would have a negative-signed dot product. If ray 406 were then to hit primitive 444, and primitive 444 had a normal on the left side, then a dot product of that normal and ray 406 also would be negative. However, in this case, primitive 444 should not be rejected as an invalid intersection based on the normal test, because ray 406 was a refraction ray and genuinely could hit primitive 444.

Considered from a complementary perspective, the disclosed methods and systems can use normal information for an intersected primitive to determine whether the ray is inside or outside a volume of a scene shape composed of primitives (or alternatively viewed, whether the ray hit an outside or an inside of a given surface), and determine whether the ray should be inside or outside of that volume. Thus, there are four combinations, two of which can be viewed as valid intersections and two of which can b viewed as invalid intersections. The valid intersections are (1) the ray hit from inside and should be inside, and (2) ray hit from outside, and should be outside, while the others are (3) where the ray should have been inside and hit from outside, and (4) should have been outside and hit from inside. Many rays ("child rays") are emitted to shade intersections involving other rays ("parent rays"). Information concerning whether a child ray should be outside of or inside of a given shape can be derived from information about whether its parent ray was inside or outside of the surface and what the child ray was intended to do (e.g., reflect or refract). In one example, both these items of information can be expressed as a bit derived from information about a difference between the normal of the surface intersected by the parent ray and the direction of the child ray.

Thus, returning to FIG. 10, normal 933 for primitive 911 points so that such a refraction ray would form an acute angle with it. Thus, the signs of the dot products for normal 921 and for normal 933 would be different, which in this convention indicates that the intersection is more likely to be valid. Similarly, however, normal 930 should not be on the same side as normal 933, or else false results may be generated when testing reflection rays from primitive 910. In this particular example, if normal 933 pointed in the opposite direction, then a refraction ray would form a negatively signed dot product with that normal, which would match the sign of the dot product of that ray and normal 921. However, because the intersection with primitive 911 is potentially valid in this instance, it can be preferable for the dot product signs to be unequal, to preserve the sign convention described as being applicable for reflection rays.

However, maintaining this normal convention is not mandatory. For example, more than one bit can be included that describes the nature of a ray, such that the sign convention can change depending on whether the ray is a reflection ray or a refraction ray.

Still further, the above explanation described how surface normals can be used in determining orientations of surfaces with respect to a ray. For example, a surface normal can be used in a dot product calculation with a direction vector for a ray incident on the surface to determine a magnitude of an angle (represented by a sign of the dot product). In other implementations, an orientation of a surface at a given intersection point can be described instead with a vector in a plane tangent to a surface at an intersection point. Other ways to represent surface orientations can be provided, and these disclosures serve as examples.

Figure 11:
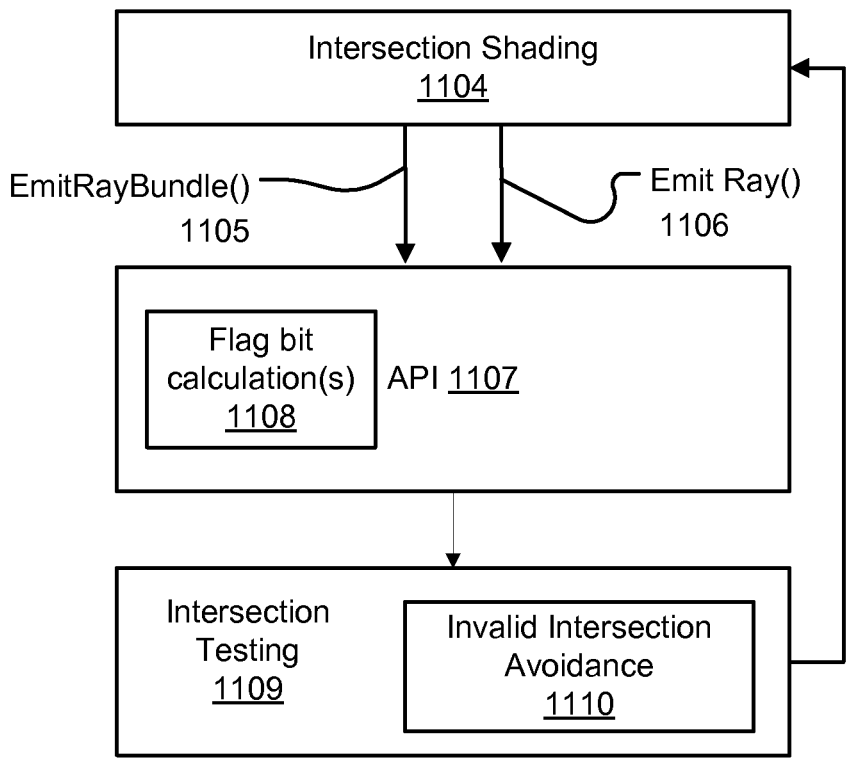
FIG. 11 depicts a system organization where ray shaders can use an API in emission of rays for testing, and the API can perform the calculations described with respect to previous figures.
Figure 12:
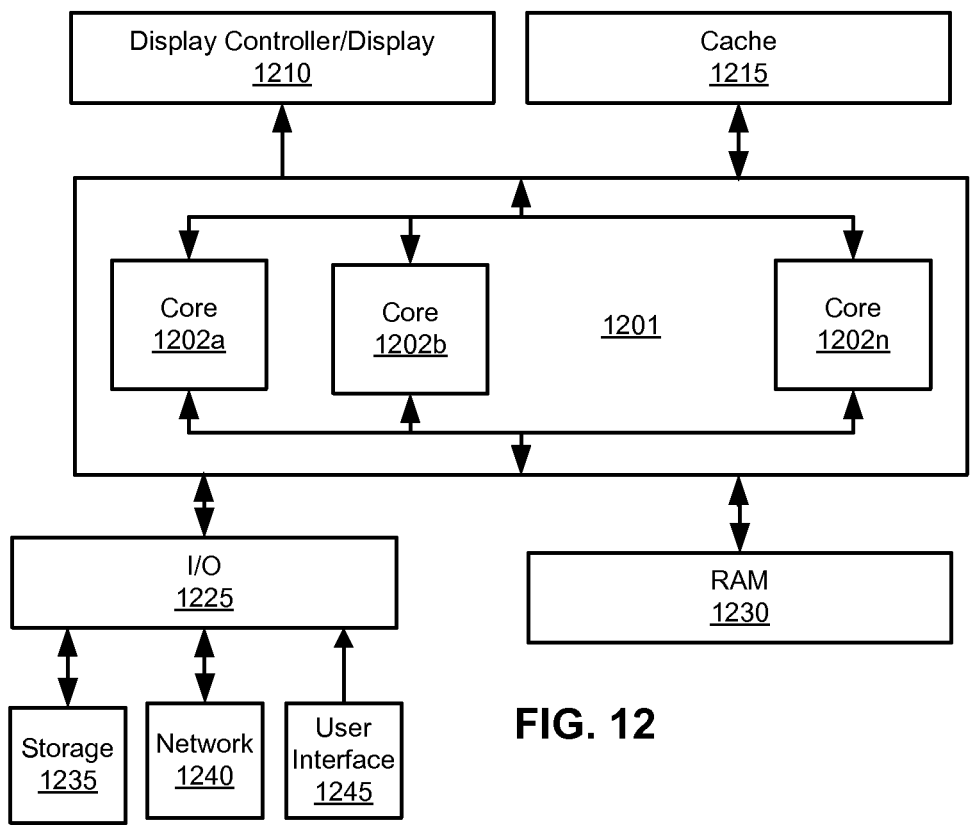
FIG. 12 depicts an example system organization in which the various aspects disclosed above can be implemented.

FIG. 11 depicts aspects relating to provision of an application programming interface (API) that can facilitate the calculation of flag bits for association with rays to be intersection tested. FIG. 11 depicts a resource for intersection shading 1104. Such a resource typically is for executing code descriptive of actions to be taken responsive to an identified intersection between a ray and a primitive; such resource can be implemented, as depicted in FIG. 12 below, using one or more computing resources, such as one or more cores of a programmable microprocessor. As such, such resource can be directed by computer executable instructions that can be obtained from a medium, such as storage 1235 (FIG. 12).

The instructions comprised in a shader for a given intersection can use API calls to emit rays for further intersection testing (e.g., the reflection and refraction rays discussed above). These calls can include a call 1105 to emit a bundle of rays and a call 1106 to emit a ray. Call 1105 can specify some attributes to be shared among the rays emitted and some attributes that are unique for each ray. Each of call 1105 and 1106 can provide the capability to attach other data, such as pointers to code, or executable code that will be performed upon completion of intersection testing or of shading of the ray emitted in that call.

These calls are serviced by API 1107 that may comprise computer executable code configuring a core illustrated in FIG. 12. One aspect of the API includes code 1108 for calculating the flag bits, and attaching such calculated bits to a datastructure storing data for the ray(s). In one example, rays are associated with a parent ray, which resulted in their emission during shading of an intersection involving the parent ray. API 1107 can access an association between that parent ray and the primitive that was intersected by the parent ray during calculations 1108. Such primitive identification information also can be provided in calls 1105 and 1106. In other examples, normal direction information can be provided in calls 1105 and 1106, maintained by, or accessible by, API 1107. Data descriptive of origin(s) and direction(s) for the ray(s) emitted, with the calculated bits can then be provided for intersection testing 1109, which contains intersection avoidance component 1110.

These aspects identified as implemented in API 1107 can be implemented as a run-time environment that makes available services that can be used by shaders. Such run-time environment can include code attached by a compiler to a shader code provided from a shader author. Such code also can be run as a part of a procedure called by shaders.

Intersection avoidance component 1110 can operate according to the examples described above, using the calculated bits, and epsilon information. In some cases, the epsilon information can be globally fixed for all rays being tested, and in other situations, the epsilon can be made variable for a ray or for a type of ray. In some cases, the epsilons can be calculated based on a hit point of the parent ray on its primitive.

FIG. 12 illustrates an example system 1200 that can be used to implement system 400 and/or components thereof. System 1200 comprises a computing resource comprising a plurality of cores 1202a-1202n, with each core being used to identify a plurality of logically and/or physically separate sub-units of computing resource 1201, which each can be used to execute operations that can be hard-coded and/or configured using code from computer readable media. For example, each core 1202a-1202n may be operable to concurrently execute multiple computing threads. Computing resource 1201 is operable to communicate with a cache 1215, which represents one or more fast access memory components, and which can be assigned to respective core(s) from cores 1202a-1202n, shared, or some combination of assignment and sharing. Each of cores 1202a-1202n can have their own caches, which can be private or shared with one or more other cores. An I/O interface 1225 provides access to non-volatile storage 1235, examples of which include one or more hard disk drives, a flash drive, DVD, or high-definition storage media. Interface 1225 also provides one or more network interfaces 1240, which can comprise, for example, Ethernet and 802.11 wireless networking capability, Bluetooth, and so on. Interface 1225 also provides access to a user interface 1245, which can comprise a mouse, keyboard, microphone, touch screen input, and so on. System 1200 also comprises a RAM 1230, which communicates with computing resource 1201, and can be used for storing code and data used more frequently than code and data stored in storage 1235. System 1210 also comprises one or more of a display controller and display, collectively identified as 1210. In some cases, one or more of cores 1202a-1202n can be physically located on a graphics card having other display controller logic, and conversely, display control logic can be co-located with computing resource 1201.

In some cases, it may be preferable to store rays currently being tested for intersection in cache 1215, while fetching primitives for testing from RAM 1230 when required.

Shaders can be stored in RAM 1230, along with texture data. Each core 1202a-1202n may be assigned to perform intersection testing or shading, or in some cases, may perform a combination of intersection and shading operations.

API 1107 can be stored in storage 1235, and loaded into RAM 1230 (or a combination of RAM 1230 and cache 1215) with a rendering application, such as a video game, a computer aided design or animation package, and so on. API 1107 also can access code and/or hardware appropriate to the particular system implementation, to implement the calls described above.

In sum, any of the functions, features, and other logic described herein can be implemented with a variety of computing resources. A computing resource can be a thread, a core, a processor, a fixed function processing element, and the like. Also, other functions, which are not primarily the focus of this description, can be provided or implemented as a process, thread or task that can be localized to one computing resource or distributed among a plurality of computing resources (e.g., a plurality of threads distributed among a plurality of physical compute resources).

Likewise, computing resources being used for intersection test can also host other processes, such as shading processes that are used to shade intersections detected. By further example, if a core can support multiple threads, then a thread can be dedicated to shading while another thread can be dedicated to intersection processing.

Code for any method can be stored in computer readable media, such as solid-state drives, hard drives, CD-ROMs and other optical storage means, and transiently in volatile memories, such as DRAM.

Computer-executable instructions comprise, for example, instructions and data which cause or otherwise configure a general purpose computer, special purpose computer, or special purpose processing device to perform a certain function or group of functions. The computer executable instructions may be, for example, binaries, intermediate format instructions such as assembly language, or source code. Some aspects of the API described herein can be implemented as procedures, functions, or calls to such procedures and functions. This description implies no limitation as to a programming methodology that can be used to implement or provide the functionality described as being available through these procedures or functions, so long as software, hardware or a mixture thereof provides a programmer with an ability to access such functionality through an interface provided therefore. Various names were provided for particular coding concepts. These names imply no requirement as to what code performing these functions need to called in an implementation, and imply no restriction on how these concepts are implemented.

The various examples described above are provided by way of illustration only and should not be construed as limiting. For example, only a limited example of ray tracing behavior was presented, and it would be understood that practical implementations involve many more rays, and often more concurrent processing thereof. The disclosures herein can be adapted and understood from that perspective. In addition, separate boxes or illustrated separation of functional elements of illustrated systems implies no required physical separation of such functions, as communications between such elements can occur by way of messaging, function calls, shared memory space, and so on, without any such physical separation. More generally, a person of ordinary skill would be able to adapt the disclosures relating to the programming semantic to a variety of other ray tracing/ray shading implementations, and no implied limitation as to its application exists from the systems, methods, and other disclosure used to explain examples thereof.

We claim:

1. A method for use in ray tracing, comprising:

receiving information for a child ray that was emitted during shading of an intersection between a parent ray and a surface in a 3-D scene;

producing a location of an intersection between the child ray and a surface in the 3-D scene, the location represented by one or more numbers within a precision of a machine number format used by a machine producing the location for the intersection;

characterizing an angle between the child ray and a normal of the surface at the child ray intersection;

categorizing the child ray intersection as a potentially valid or as a potentially invalid intersection based on the characterization of the angle between the child ray and the surface normal of the child ray intersection, and information characterizing the direction of the child ray compared with a normal of the surface at the intersection involving the parent ray; and proceeding with ray tracing in the 3-D scene responsive to the categorizing.

2. The method of claim 1, wherein the information characterizing the direction of the child ray comprises a bit indicating whether an angle between the child ray direction and the normal of the surface at the parent ray intersection is more or less than 90 degrees, and the characterizing comprises determining whether the angle between the child ray and the surface normal for the child ray intersection is more or less than 90 degrees.

3. The method of claim 2, wherein the categorizing comprises treating the identified child ray intersection as possibly invalid, if both the angles are less than 90 degrees.

4. The method of claim 1, wherein the information characterizing the direction of the child ray comprises a sign bit from a dot product between the child ray direction and the surface normal of the parent ray intersection, and the categorizing comprises obtaining a sign of a dot product between the surface normal of the child ray intersection and the child ray direction, and comparing the sign bit with the obtained dot product sign.

5. The method of claim 1, wherein the child ray was emitted for traveling through the surface intersected by the parent ray, and the characterizing information indicates that an angle between the normal of the surface intersected by the parent ray and the direction of the child ray is greater than 90 degrees.

6. The method of claim 1, wherein the child ray was emitted for reflecting from the surface intersected by the parent ray, and the categorizing comprises detecting that the child ray intersects the same surface as the parent ray by detecting that the child ray direction information characterizing the direction of the child ray indicates that the angle between the normal of the surface intersected by the parent ray and the direction of the child ray is less than 90 degrees.

7. The method of claim 1, wherein the information characterizing the direction of the child ray comprises a bit indicating a magnitude of an angle between the child ray direction and the surface normal of the parent ray intersection.

8. The method of claim 7, wherein the bit indicates whether the angle between the child ray direction and the surface normal of the parent ray intersection is greater than or less than 90 degrees.

9. The method of claim 1, wherein the surface intersected by the child ray is a primitive associated with definition data for the surface normal of the child ray intersection.

10. The method of claim 1, wherein the categorizing of the child ray intersection comprises determining at least the sign of a dot product between the surface normal for the child ray intersection and the child ray direction, and comparing that determined dot product sign with a bit associated with the child ray.

11. The method of claim 1, wherein the categorizing further requires a valid intersection to have at least a minimum distance between an origin of the child ray and the surface intersected by the child ray, in one or more of the direction along the normal of the surface intersected by the child ray and the direction of travel of the child ray.

12. A computation system for intersection testing rays in a 3-D scene, comprising:
an intersection tester, comprising at least one of a fixed function test cell and a programmable processor, for testing a ray for intersection with shapes composing a 3-D scene and outputting an indication for a detected intersection with a shape, wherein the detected intersection is located within a precision afforded by a limited precision machine number format; and
an intersection verifier configured for comparing a direction of the ray with a normal for a surface of the intersected shape, for accessing a flag associated with the ray indicative of an expected directional difference between the ray direction and the surface normal, and for using the flag and the comparison in analyzing whether or not the intersected shape represents a valid intersection.

13. The system of claim 12, further comprising a non-transitory medium storing computer executable code for a shader that when executed by a processor is operable to set the flag during emission of the ray.

14. The system of claim 12, further comprising a non-transitory medium storing computer executable code for configuring a processor to implement an application programming interface operable to receive, from a shader, definition data for the ray.

15. The system of claim 12, wherein the intersection verifier further is configured for determining a distance along the normal from an origin of the ray to the surface of the intersected object, and using that distance in the analysis of the validity of the detected intersection.

16. The system of claim 12, wherein the intersection verifier further is configured for determining a distance along the ray direction from an origin of the ray to a point of intersection between the ray and the surface, and using that distance in the analysis of the validity of the detected intersection.

17. The system of claim 12, further comprising a shader execution resource operable to execute a shader for an intersection of a parent ray, the execution resulting in the child ray and the flag.

18. The system of claim 12, wherein the intersection verifier further is configured for determining a distance along the normal from an origin of the ray to the surface of the intersected object and a distance along the direction of ray travel between the origin and the surface of the intersected shape, and using both distances in further analysis of whether the detected intersection is valid.

19. The system of claim 12, wherein the intersection verifier comprises a processor configured with code obtained from a non-transitory computer readable medium.

20. A non-transitory computer program product comprising a computer readable medium storing instructions for performing a method for use in ray tracing, comprising:
receiving information for a child ray that was emitted during shading of an intersection involving a parent ray in a 3-D scene;
identifying an intersection for the child ray in the 3-D scene;
comparing a direction of travel of the child ray and a surface normal for the child ray intersection; and
categorizing the child ray intersection as a potentially valid or as a potentially invalid intersection based on the comparing and information characterizing the direction of the child ray compared with a surface normal for the intersection involving the parent ray.

21. The computer program product of claim 20, wherein the receiving is implemented with computer executable code obtained from a non-transitory medium describing an application programming interface for accepting rays from shaders being executed.

22. The computer program product of claim 21, wherein the application programming interface further comprises computer executable code for calculating a bit indicative of a magnitude of an angle between the child ray and the surface normal for the intersection involving the parent ray and associating the calculated bit with the child ray.

23. The computer program product of claim 20, wherein the categorizing further requires a valid intersection to have at least a minimum distance between an origin of the child ray and a surface of an object intersected by the child ray, in a direction of the surface normal for the child ray intersection.

24. The computer program product of claim 20, wherein the categorizing further requires a valid intersection to have at least a minimum distance between an origin of the child ray and a surface of an object intersected by the child ray, in the travel direction of the child ray.

25. The computer program product of claim 20, further comprising computer executable code for implementing a run time environment for executing shaders, the run time environment providing a function call to accept definition data from an executing shader for the child ray, and to produce the information characterizing the direction of the child ray.

26. A method for use in ray tracing, comprising:
identifying a location of an intersection between a child ray and a surface of a 3-D scene within a numerical precision of a machine number format used in a machine performing the identifying;
comparing a direction of travel of the child ray with each of an orientation of a surface from which the child ray originates and an orientation of the surface intersected by the child ray;
categorizing the intersection of the child ray as a potentially valid or as a potentially invalid intersection based at least in part on the comparison; and
proceeding with the ray tracing of the 3-D scene responsive to the categorizing.

27. The method of claim 26, wherein the orientation of the surface from which the child ray originates and the orientation of the surface intersected by the child ray are each represented by a respective surface normal.

28. The method of claim 26, wherein the surface intersected by the child ray comprises a primitive of a primitive mesh defining an object in the 3-D scene, the primitive being associate with a normal used in determining the orientation of the surface intersected by the child ray.

29. The method of claim 26, further comprising originating the child ray from the surface from which it originates by shading an intersection between a parent ray and that surface.

30. The method of claim 26, further comprising using a limited-precision numerical representation of an origin of the child ray, such that the numerical representation of the child ray origin may deviate from a theoretically-precise origin of the child ray on the surface.

31. The method of claim 26, wherein the proceeding comprises performing further testing for the intersection, if the intersection was categorized as potentially invalid.

* * * * *

UNITED STATES PATENT AND TRADEMARK OFFICE
CERTIFICATE OF CORRECTION

PATENT NO.        : 8,441,482 B2
APPLICATION NO.   : 12/563436
DATED             : May 14, 2013
INVENTOR(S)       : Cuneyt Ozdas and Jason R. Redgrave It is certified that error appears in the above-identified patent and that said Letters Patent is hereby corrected as shown below:

On the Title Page, Item (75)

In the names of the inventors, please change:

"Ozdac; Cuneyt" to -- Ozdas, Cuneyt --

Signed and Sealed this
Twenty-fourth Day of December, 2013

Margaret A. Focarino
*Commissioner for Patents of the United States Patent and Trademark Office*